United States Patent [19]

Dunn et al.

[11] 3,923,362

[45] Dec. 2, 1975

[54] WIRE CONNECTING BLOCKS

[75] Inventors: Robert Brian Dunn; James Edward Butler, both of Ottawa, Canada

[73] Assignee: Northern Electric Company Limited, Montreal, Canada

[22] Filed: Dec. 19, 1974

[21] Appl. No.: 534,194

[52] U.S. Cl. .................................. 339/96; 339/99 R

[51] Int. Cl.[2] .......................................... H01R 13/38

[58] Field of Search ................................ 339/97–99, 339/96

[56] References Cited

UNITED STATES PATENTS

| | | | |
|---|---|---|---|
| 3,573,713 | 4/1971 | Enright et al. | 339/98 |
| 3,798,587 | 3/1974 | Ellis, Jr. et al. | 339/97 P |
| 3,836,415 | 9/1974 | Hilderbrandt | 339/97 R |

*Primary Examiner*—Joseph H. McGlynn
*Attorney, Agent, or Firm*—Sidney T. Jelly

[57] ABSTRACT

A wire connecting block, such as is particularly suitable for the interconnection of feeder cable conductors to distributor cable conductors, comprises a base having recesses in which are positioned conductors from one cable, and a clip-on module which has a plurality of contact clips contained therein. As the module is clipped on, the inner end of each contact clip enters a related recess in the base and makes electrical connection with the conductor in the recess. Conductors from the other cable are connected to the outer ends of the contact clips and a cover clips over the module. Pads containing an anticorrosive sealant are positioned in the module to envelope the contacts between contact clips and conductors in the base and a further pad in the cover envelopes the connections between connectors and contact clips at the outer ends of the clips.

6 Claims, 17 Drawing Figures

WIRE CONNECTING BLOCKS

This invention relates to a wire connecting block and in particular, but not exclusively, to connecting blocks for connecting wires from a feed cable to wires of a distributing cable in a telephone system.

Connecting means are necessary at distribution points for connecting the main feed cable conductors to the distributing cable conductors. Such connections are not usually a once and for all connection as it is usually necessary to change connections between feed cable conductors and distributor cable conductors to alter subscriber telephone numbers, as when subscribers move or require a number change. Connectors are usually in positions in which environmental conditions can have a serious effect on the connectors. Corrosion is a problem. Ingress of dirt and damp also create leakage paths, which detrimentally affect the signal quality.

The mounting of connectors in distributing boxes result in a large number of connections in a confined space and it is desirable to make the connectors compact to reduce space requirements and also to provide easy and quick access for wiring or altering wiring.

The present invention provides connecting blocks which are compact, give ready access for wiring, and provides a very simple means for interconnecting conductors of feed cables and distributing cables. The interconnecting means readily enable interconnections to be altered, are sealed against moisture, and provide other advantages, as will be seen.

Broadly a connector in accordance with the present invention comprises a base having a plurality of recesses for reception of conductors; a clip-on module having a plurality of contact clips, a contact clip entering each recess in the base and electrically engaging with the conductor in that recess at one end of the contact clip, the other end of each clip available for connection of a conductor thereto; a clip-on cover, and compressible pads in the module and cover containing a sealant grease or similar material which envelopes the connection between conductor and contact at each end of the contact.

The invention will be readily understood by the following description of an embodiment, by way of example, in conjunction with the accompanying drawings, in which.

Figures 1, 4, 5:
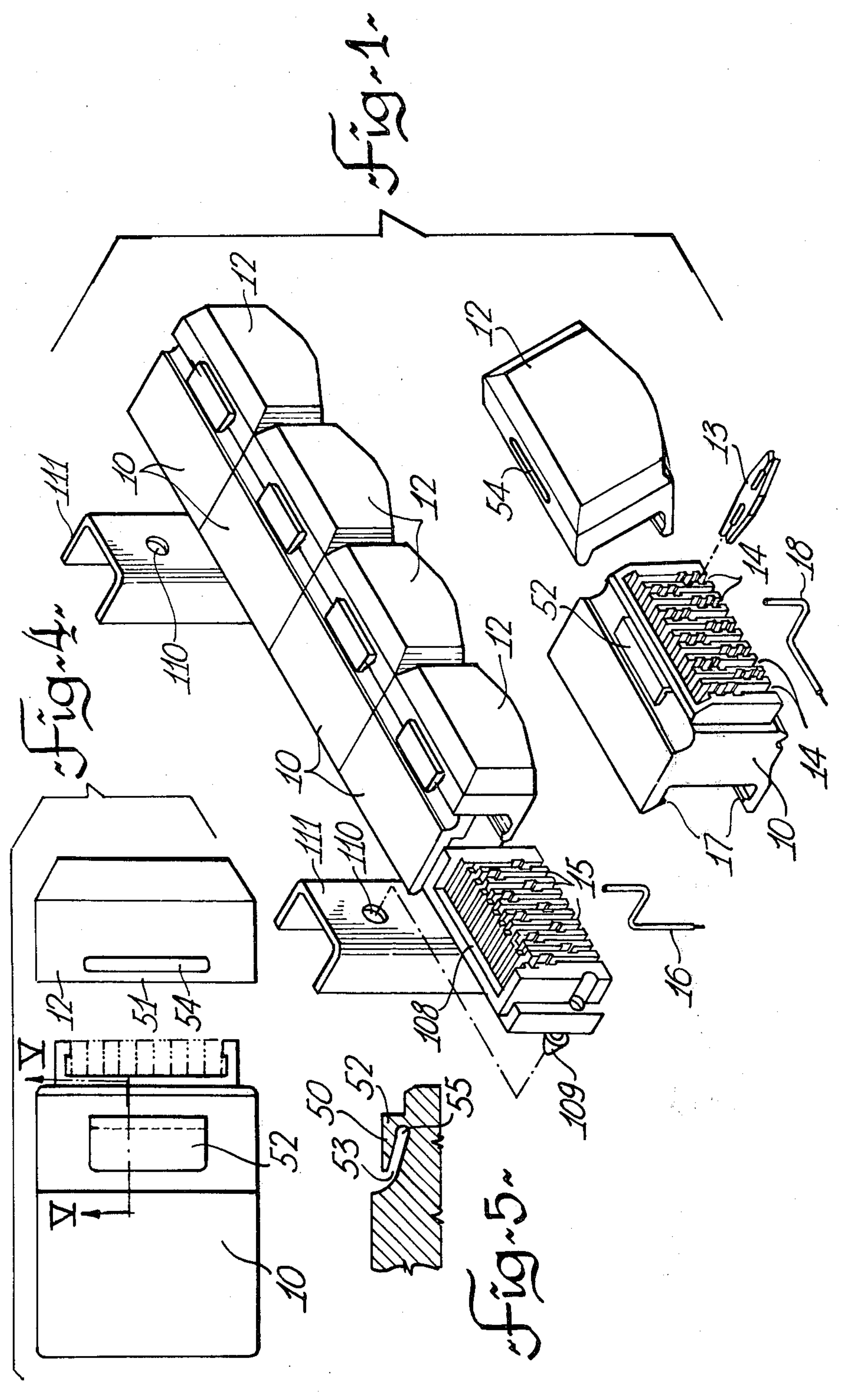
FIG. 1 is a perspective view of a five unit connector, with one unit shown exploded.
FIG. 4 is a top plan view of a module and associated cover, separated to show one form of hinge structure.
FIG. 5 is a cross-section on the line V—V of FIG. 4.

Illustrated in FIG. 1 is a connector block unit comprising five modules 10, four of the modules assembled to a base member 11 and one module removed. On each module fits a cover 12. Each module has 10 double-ended insulation-slicing contact clips, one of which is illustrated at 13. The contact clips are arranged in two rows of five and the bottom row is staggered relative to the top view. The positions of the contact clips in the module are indicated by the recesses 14.

In the example illustrated the base member 11 is a single unit and accepts five modules. As an alternative a separate base member may be provided for each module. Thus, in the example one cable pair binder group of 25 pairs is fed to the base member, a wire in each groove 15 in the base member one wire indicated at 16. Five modules are clipped over the base member, the modules having snap-on locking formations 17 on top and bottom edges. Clipping on a module forces a contact clip over each wire in the base member, inner end of the contact clip slicing the insulation of the wire and creating an electrical connection between wire and clip. Wires can then be inserted into the outer ends of the clips. One such wire is indicated at 18. Conveniently for the five pairs of wires in each module 10 the "tip" wire terminations are in the top row and the "ring" wire terminations are in the bottom row.

The covers 12, in the example illustrated are hingedly attached to the modules at the top edges. Interengaging formations form a hinge —seen in more detail in FIGS. 2, 3, 4 and 5— and the covers have a resilient formation on their lower edges which clip into grooves in the modules 10. This is also seen in more detail in FIGS. 2 and 3.

Figure 2:
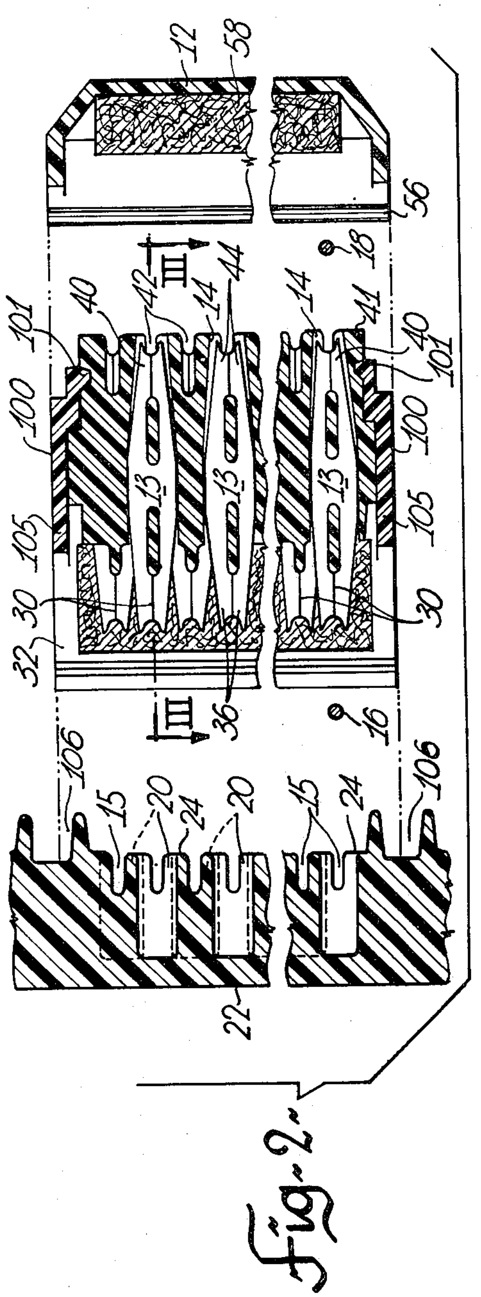
FIG. 2 is a cross-section on the line II—II of FIG. 3.
Figure 3:
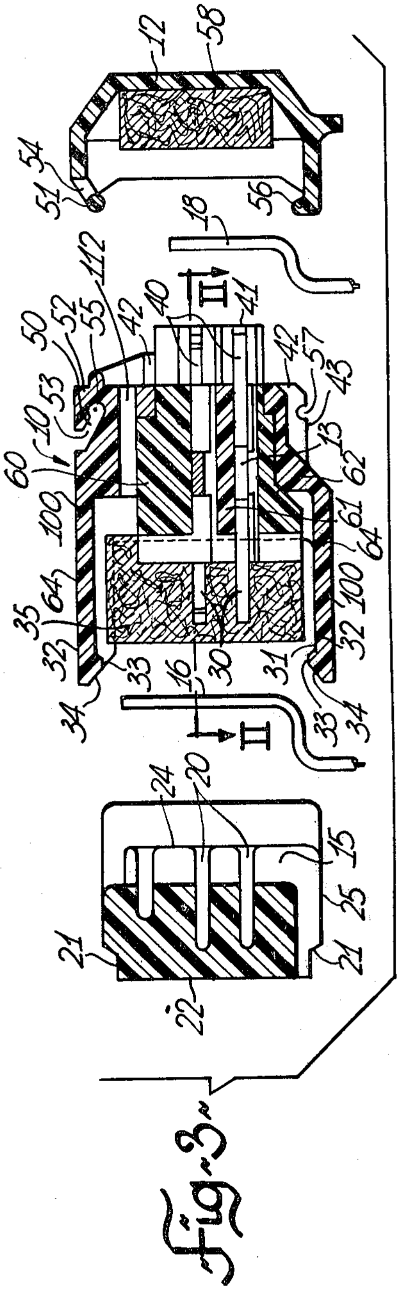
FIG. 3 is a cross-section on the line III—III of FIG. 2.

FIGS. 2 and 3 are cross-sections through base, module and cover, with the various members separated for clarity. As in FIG. 1, the base member 11 is of a length for five modules 10. The base member is of molded construction and two rows of recesses 20. The recesses in one row are staggered relative to the recesses of the other row so as to align with the positions 14 in the modules, that is with the contact clips 13. As seen in FIG. 3 the base member has undercut formations 21 along the top and bottom edges of the rear surface 22. The grooves 16 extend across the front surface 24 of the base member, the grooves also extending across the bottom surface 25 to provide access for the wires 16.

Each module 10 has ten contact clips 13 in two rows, the clips staggered. The rear ends 30 of the clips extend into a recess 31 at the rear of each module, the recess 31 formed by the extended top and bottom walls 32 of the module. The ends of the walls 32 have small inwardly extending projections 33 with inclined rear surfaces 34. Also positioned in the recess 31 is a pad 35 of compressible material filled with a sealant such as grease. The ends 30 of the contact clips 13 pass through the pad 35 as the pad compresses on attachment of the module to the base member. Pushing on the module 10 causes the contact clips 13 to engage the wires 16. Continued pressure forces the wires between the legs 36 of the rear ends of the contact clips. The legs slice the insulation of the wires and electrical contact is made between the wire conductor and the contact clip. When the module is in its final position, the projections 33 engage in the undercuts 21.

The front ends 40 of the contact clips 13 are positioned in the recesses 14 in the front surface 41 of the modules. Grooves 42 extend vertically in the front surface 41, and also down part of the bottom surface 43, to provide access for the wires 18. To connect the wires 18 to the front ends 40 of the contact clips 13, a wire is positioned in a groove 42 across the front end of a terminal clip. The wire is then pushed down between the legs 44 of the terminal clip by a tool to be described later. As the wires are pushed down between the legs 44 the insulation of the wire is cut and electrical contact between wire and contact clip occurs.

A cover 12 fits over the front of each module 10. In the example illustrated the cover is retained on the module by a hinge structure and interengaging formations. The hinge structure comprises a groove formation 50 on the top edge of the module and a bar 51 on the top edge of the cover. The hinge structure is seen in more detail in FIGS. 4 and 5. The groove formation 50 is formed by a projection 52 extending over the central portion of the module and having a rearward facing slot 53. The bar on the cover 12 is formed by creating an aperture 54 extending for the central part of the top edge of the cover. The aperture 54 is of the same length as the projection 52 and of a size that the projection 52 can pass through it. The bar 51 can pass down the slot 53 by causing the projection 52 to flex upwardly slightly. At the end of the slot 53 the bar 51 enters a slight enlargement 55 at the end of the slot 53 and can pivot in this enlargement.

The lower edge of the cover 12 has an inwardly projecting rib 56. A cooperating groove 57 is formed in the bottom surface 43 of the module 10. Positioned in the cover is a pad of compressible material 58 impregnated with a sealant, such as grease. When the cover 12 is clipped in position on the module 10, the front ends of the contact clips 13 are pressed into the pad 58. This seals off the contact between wire and terminal clip and reduces or arrests corrosion.

The module 10 can be made in various ways. One such method is by molding as one unit with the contact clips 13 molded in situ, but such a mold would be complex and expensive. In the example illustrated the module has been made by a sandwich construction comprising three core members and an outer member or casing. The three core members are indicated at 60, 61 and 62 in FIG. 3, and the casing 64. The core members are assembled together with the terminal clips sandwiched between them.

The form of the core members is seen more clearly in FIGS. 6 to 13, which are exploded and assembled view of a module from the top and the bottom. As seen in FIGS. 6 to 13, member 62, conveniently referred to as the bottom member, has flat back surface 70 with a projecting bottom edge 71. On its front surface are formed a series of parallel grooves 72 —five in number. The grooves 72 are formed in five parallel ribs 73 with channels 74 therebetween.

Member 61, referred to as the centre member, has a central laterally extending web 75 with four central ribs 76 and end ribs 77 and 78. These ribs 76, 77 and 78 extend normal to the web 75 on both sides of the web. Grooves 79 extend across the outer ends of the ribs 76 and 77. Grooves 80 extend down one surface —the top surface 81— of the ribs 76 and 77. On the bottom or lower surface of the web 74, between the ribs 76, 77 and 78 are formed elongate projections 82. Two projections 82 are formed in channels 83 between each pair of ribs and these ribs are positioned to engage in holes the contact clips 13. Channels 83 are positioned so as to fit over the ribs 73 —FIG. 6.

Member 60, the top member, has a main back web or body portion 85 from the lower surface of which project four central ribs 86, and end ribs 87 and 88. The ribs 86 and 88 have grooves 89 extending across the outer end thereof. Between the ribs 86, 87 and 88 are formed elongate projections 90. Two projections 90 are formed in channels 91 between each pair of ribs and are positioned to engage in holes in further contact clips 13. The ribs 86 are positioned in the top member 60 so as to enter channels 92 between the ribs 76 and 77 —FIG. 7.

Figures 6, 7, 8, 9:
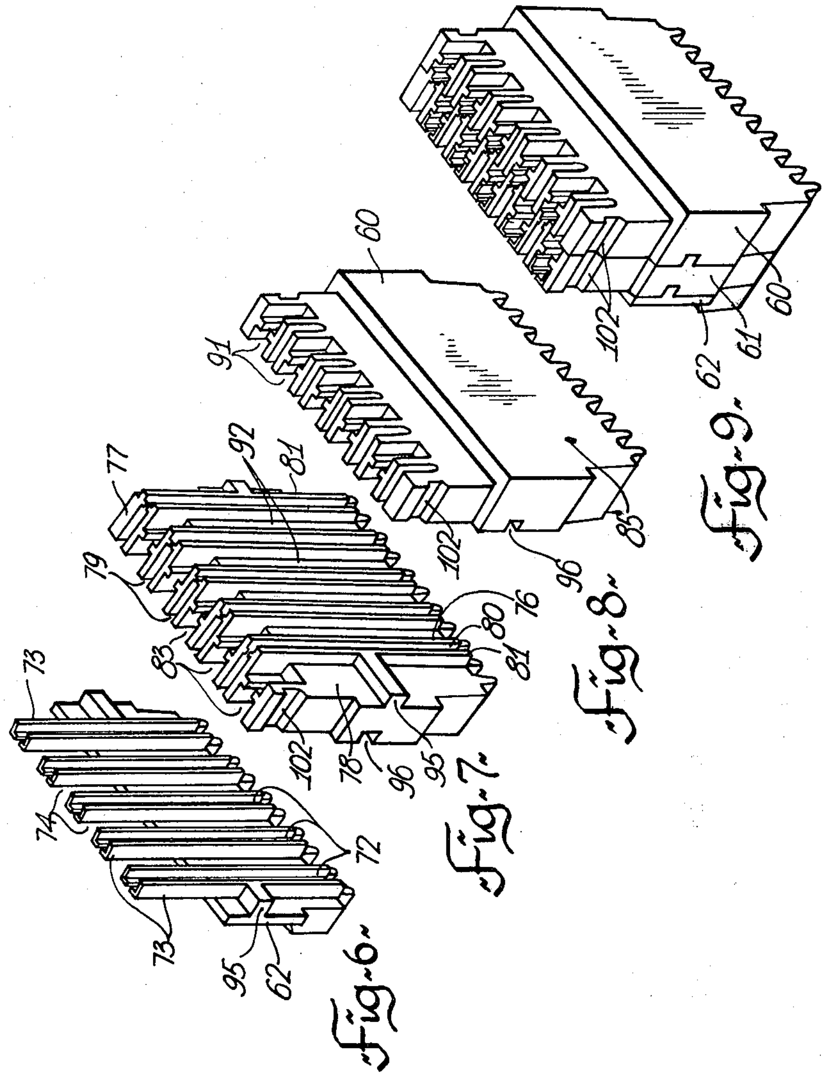
FIGS. 6 to 13 illustrate one form of module, being perspective views of individual parts and assembled modules, viewed from the top and from the rear bottom.
Figures 10, 11, 12, 13:
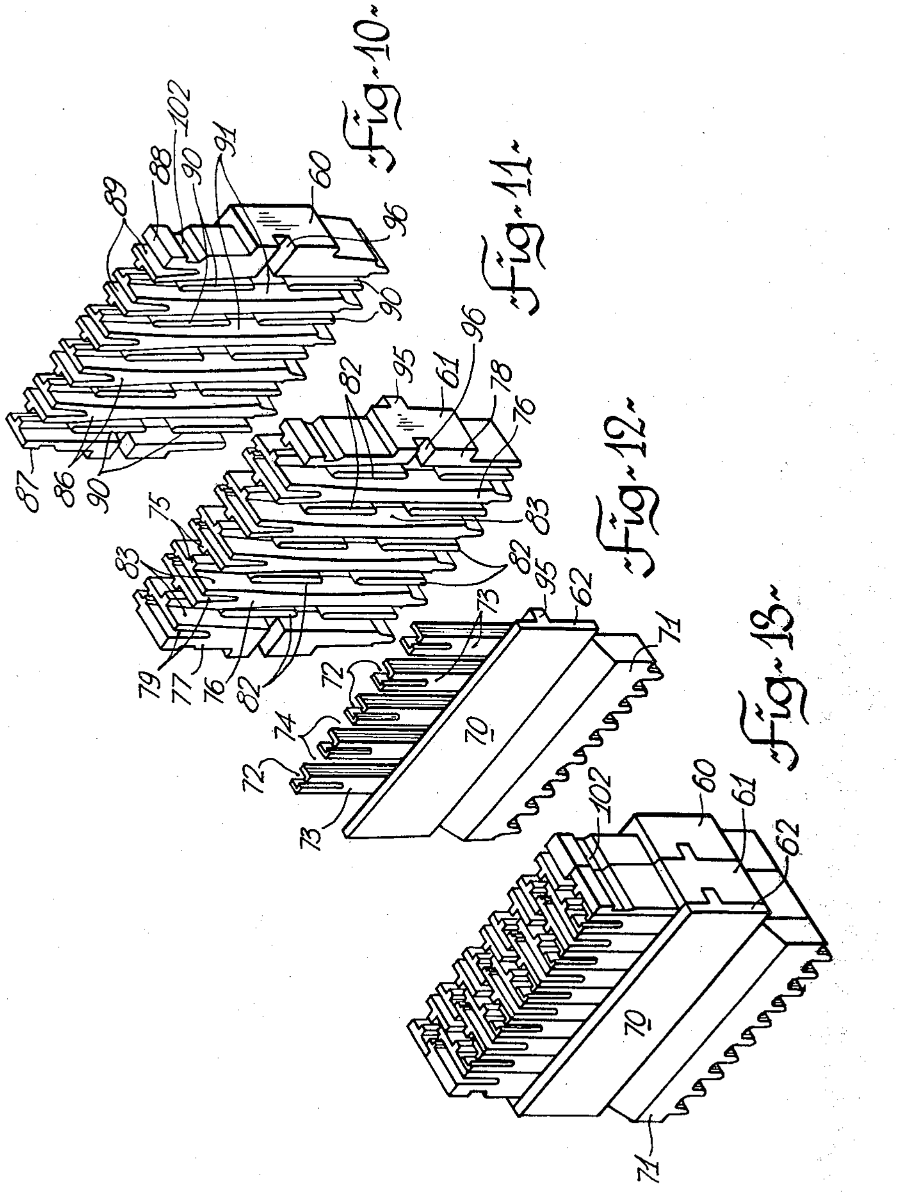

The three members 60, 61 and 62 are shown assembled in FIGS. 9 and 13. Projections 95 are formed on members 61 and 62 and cooperating recesses 96 on members 60 and 61 to provide location between members. Prior to assembly contact clips are positioned in channels 83 fitting over projections 82 and also in channels 91, fitting over projections 90. The three members are than pressed together, ribs 73 of bottom member 62 entering the channels 83 of centre member 61 and holding one row of contact clips in position, and the upper ends of ribs 76 and 77 of centre member 61 entering channels 91 of the top member 60 to hold the other row of contact clips in position. It will be noted that the channels 91 of top member 60 are offset laterally relative to the channels 83 of the centre member 61. This provides for the staggering of the rows of contact clips 13.

When the three members are assembled, as in FIGS. 9 and 13, they are inserted in an outer member, indicated at 100 in FIGS. 2 and 3. The outer member 100 has inwardly projecting ribs 101 on the sides at the forward edges of these ribs engage with recesses 102 which extend across the sides of the members 60 and 61, to retain the assembly together. Alternate ways of maintaining the assembly together can be used, such as adhesives, welding and the like.

The various members are shaped to prevent water entering the connector. Thus the module 10, in addition to entirely encompassing the base member 11 on its top and bottom edges, has side members or skirts —105 in FIG. 2— which enter channels 106 —FIG. 2— in the base member. Also the cover 12 fits all round the module 10 and has a projecting rib 107 —FIG. 1— which is shaped to provide a drip member to encourage any water on the connector to drip off.

Colour coding can be provided for each module, for example along the edge 108 —FIG. 1. Various means can be used for mounting a base member on a support. In FIG. 1, with a base member 11 being five units long, snap-plug type fasteners 109 are shown which snap into ready drilled holes 110 in a support frame 111. The snap plugs can be removeable to leave holes to permit mounting by screws.

Seen in FIG. 3 is an additional feature which can be provided. Grooves 112 are formed in the top inner surface of outer member 100, these grooves forming enclosed channels when the module is assembled. It is possible to insert temporary connections into these channels. Thus, for example, if it is intended to change a connection to the outer ends of a pair of contact clips, such as when changing a subscriber member or other reason, a temporary connection can be established by one of these channels before the related wire 18 is disconnected. When the wire 18 is reconnected to its new contact clip the temporary connection can be removed. It is also possible to use the channels formed by grooves 112 to check continuity and the like by means of probes.

FIGS. 14, 15, 16 and 17 illustrate one form of tool for inserting the wires 18 into the terminals 13.

Figures 14, 15, 16, 17:
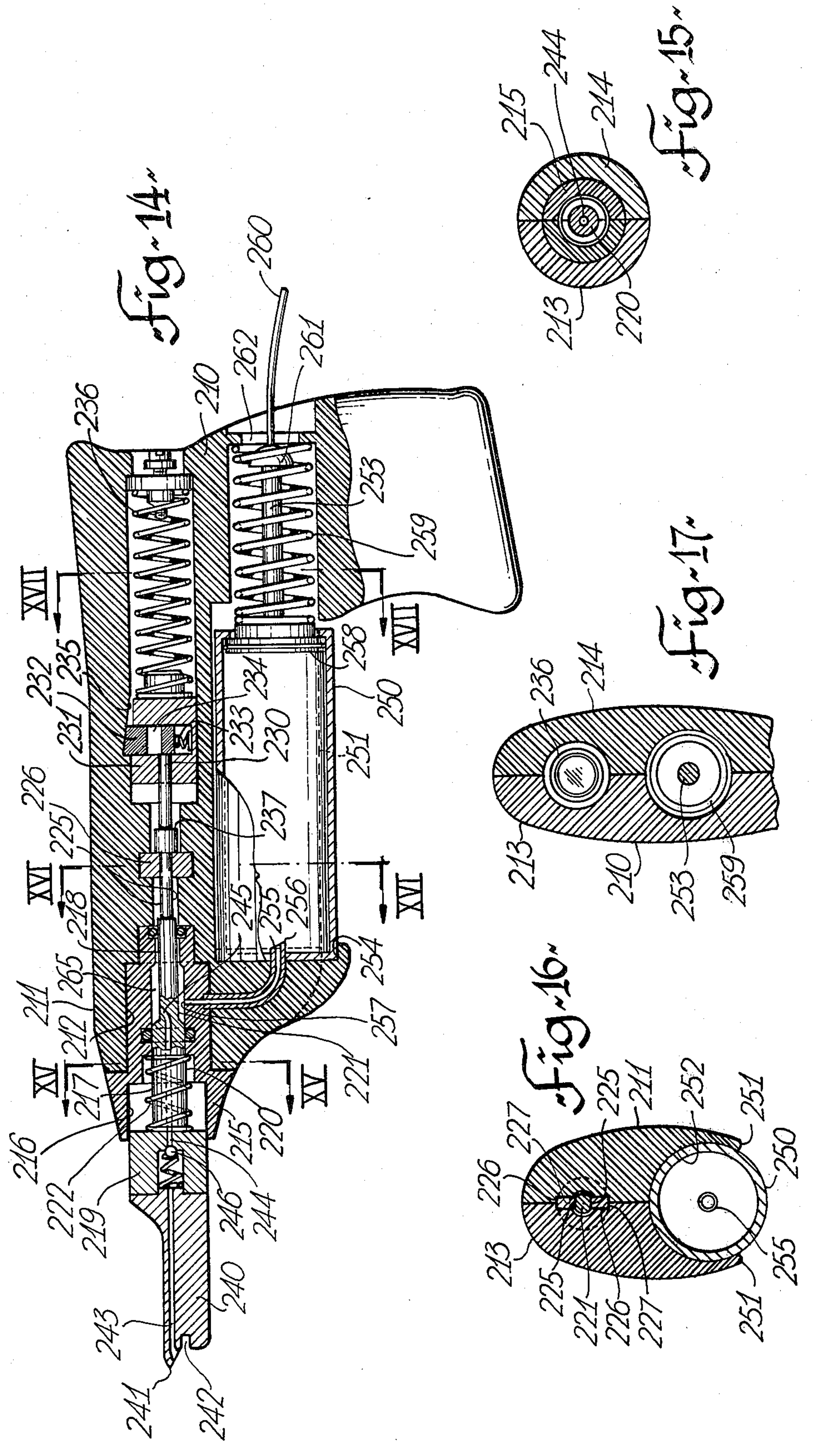
FIGS. 14 to 17 illustrate one form of tool for inserting wires.

As illustrated in FIG. 14, a wire insertion tool has a handle portion 210 and a barrel portion 211. The barrel portion is hollow, having an axially extending bore 212. Conveniently the tool casing is formed from two plastic moldings — forming opposed halves 213 and 214, as seen in FIGS. 15, 16 and 17.

At the forward end of the bore 212 is mounted a metal cylinder 215. Cylinder 215 has an axially extending bore having three main diameter portions 216, 217 and 218, portion 216 the largest and at the forward end, portion 217 the intermediate diameter; and portion 218 the smallest diameter and at the rearward end.

Slidable axially in the bore of the cylinder 215 is a piston 219. The forward end of piston 219 is a close sliding fit in portion 216 of the cylinder bore, an intermediate portion 220 is a close sliding fit in the intermediate diameter portion of the cylinder bore and a rear portion 221 is a close sliding fit in the smallest diameter portion of the cylinder bore. A compression spring 222 sits on the rear face of the forward end of piston 219 to urge the piston to a forward position.

The piston 219 extends rearwardly beyond the cylinder 215. Two flats 225 are formed on the small diameter portion 221, the flats cooperating with slider members 226 retained in recesses 227 in the tool casing. Flats 225 and members 226 maintain the correct positioning of the piston 219 in the tool.

At the rear end of the piston 219 is an extension 230 on which is mounted a conventional impact mechanism. This mechanism comprises an anvil 231 axially slidable on the extension 230, with a radially slidable plunger 232. Plunger 232 is urged towards the casing by a spring 233, and there is an internal bore 234. Normally the bore 234 is offset relative to the extension 230, but rearward movement of the piston 269, and thus extension 230 moves the anvil 231 rearwards due to the end of the extension 230 pushing on the plunger 232. The outer end of the plunger 232 is inclined and moves axially against an inclined surface 235 on the bore of the casing. The anvil moves rearward against the action of a spring 236. As rearward movement continues the plunger is moved radially inwards until the bore 234 is aligned with the extension 230 at which the anvil is pushed rapidly against the end surface 237 on the portion 221 of the piston. This actuates a cutting action as will be described. The impact mechanism is of a well known form.

Mounted on the forward end of the piston 219 is a cutting and ejection head 240. At the forward end is a chisel shaped cutting edge 241, and beneath the cutting edge is a clearance slot 242 which fits over a terminal when a wire is being inserted. Extending through the head 240 is an axial bore 243 which is aligned with an axial bore 244 extending through the forward part of the piston 219. The bore 243 eventually exits at port 245 in the circumference of the portion 221 of piston 219 just rearward of the junction between portion 221 and portion 220. At the junction between bore 243 and bore 244 is a one way spring loaded ball valve 246.

Attached beneath the barrel portion of the tool is a cartridge 250 of sealant material — for example a non-corrosive grease. The cartridge 250 snaps into position by flexing of the edges 251 of a recess 252. The cartridge is inserted by snapping in and is then pushed forward by a spring loaded plunger or piston 253. The forward end of the cartridge enters a recess 254 and at the same time a feed tube 255, having a sharpened end 256 pierces the end of the cartridge. The feed tube 255 extends through the tool casing to exit via a port 257 in the portion 217 of the axial bore in the cylinder 215. Port 257 is slightly forward of the junction of portions 217 and 218 of the bore. The plunger of piston 253 acts on a movable end 258 of the cartridge under the action of the spring 259. The plunger can be withdrawn by a flexible cable 260. An enlargement 261 on the plunger 253 can be caused to engage with a rim 262 in the handle portion to hold the plunger withdrawn while a used cartridge is removed and a new cartridge inserted.

The tool as illustrated is in the free or inactivated condition. Between the rear end of portion 220 of piston 219 and the reduced diameter portion 218 of the cylinder 215 is formed a chamber 265. The port 257, at the end of the feed tube 255, opens into this chamber at a position towards the end of portion 220 of the piston. This chamber 265 is filled with the sealing compound from the cartridge 250 via the feed tube 255. The spring loaded ball valve 246 closes the bore or feed passage 243.

The particular form of cutting and ejection head 240 fitted to the piston 219, is designed for inserting the wires 18 (FIG. 1) into the terminals 13 (FIG. 12). As the wire is pushed into the gap edges on the legs cut into the electrical insulation and electrical contact is made between terminal and wire.

To install or insert a wire into a terminal, the wire 18 is positioned across the terminal 13 resting on the top of the narrow gap. The tool is positioned with the slot 242 aligned with the outer end of the terminal 13. Pressure on the tool causes the edge 241 and the flat end 266 to push the wire down in the gap, between the legs of the terminal. At the same time the piston 219 is moving rearwards in the barrell portion 211. Movement of the piston 219 reduces the volume of the chamber 265.

After a short movement of the piston 219 the port 257 at the end of feed tube 255 is shut off by the portion 220 of the piston 219. Further rearward movement of the piston forces sealing material, or grease, via port 245 to bore 244. Valve 246 is opened and the sealing material passes along bore 243 and is ejected at an outlet 267 just below the cutting edge 241 on to the connection between wires and terminal.

Also, as the piston 219 is moving rearwards the impact mechanism is actuated. The end of the extension 230 pushes back the anvil 231 and plunger 232. As anvil and plunger move rearwards, the plunger is pushed down by the inclined surface 235. Eventually the bore 234 in the plunger 232 becomes aligned with the end of the extension 230 and the anvil is thrust rapidly against the end surface 237 of portion 221, as previously described. This causes a sharp blow to be imparted to piston 219 and the cutting head 240 cutting the wire 18 by the cutting edge 241.

Removal of the tool reverses this operation. Piston 219 returns forward under the action of the spring 222, uncovering port 257 which allows sealing material to flow from the cartridge 250 into the chamber 265. At the same time the impact mechanism is reset.

What is claimed is:

1. A wire connector block comprising:

a base, said base including a plurality of recesses for the reception of conductors, a conductor in each recess;

a module adapted to clip-on said base;

a plurality of contact clips in said module, a contact clip for each recess, a rear end of each contact clip extending from a back face of said module and positioned to enter a related recess and electrically engage with the conductor in the recess;

a front end of each contact clip extending adjacent to a front face of said module and adapted to receive a further conductor;

a clip-on cover adapted to fit on said front face of said module;

a compressible pad in a recess at said back face of said module, and a compressible pad in said cover and adapted to engage said other ends of said contact clips, said pads containing a sealant, said sealant encasing the connections between conductors and contact clips on assembly of the connector block.

2. A wire connecting block as claimed in claim 1, including a plurality of recesses in said front face of said module, each recess adapted to receive a conductor, said front ends of said connector clips extending into said recesses in said front face, a connector clip end in each recess.

3. A wire connecting block as claimed in claim 1, including interengaging formations on said base and said module, the formations on said module adapted to deform and clip into engagement with said formations on said base.

4. A wire connecting block as claimed in claim 1, said cover hingedly attached to said module.

5. A wire connecting block as claimed in claim 1, said module being of sandwich construction and comprising a plurality of members, said members adapted to engage with one another on planes normal to said back and front faces of said module, and including first and second outer members and an inner member, said inner member having first and second side faces, each side face having a plurality of recesses extending from the rear face to the front face of the module, said connector clips positioned in said recesses, said first and second outer members engaging with said first and second side faces respectively to retain said conductor clips in said recesses.

6. A wire connecting block as claimed in claim 5, including interengaging formations on said members, said formations retaining said members in an assembled condition.

* * * * *